Patented Aug. 18, 1931

1,819,064

UNITED STATES PATENT OFFICE

ERNST BAÜMGARTNER, OF KLADNO, CZECHOSLOVAKIA

OPERATION OF BLAST FURNACES

No Drawing. Application filed February 7, 1930, Serial No. 426,782, and in Germany February 11, 1929.

It has been proposed to use the fluxes required in the blast furnace process, such as limestone or dolomite, in the form of the roasted (calcined) condition instead of that of the raw material. It was expected that in this manner there would be a saving of fuel in the blast furnace in that the quantity of heat necessary for expelling the carbon dioxide from the limestone or raw dolomite would be expended before in a separate process carried out outside the blast furnace, such a saving of fuel being desirable. The experiments tried in this direction, however, have not led to useful results because blast furnaces, the load for which contains lime or burnt dolomite showed such hanging of the charge, such escape of heat due to upper, crooked motion of the charges combined with driving out of dust, and produced such considerable variations in the composition of the pig iron and of the slag and other disturbances of working that the anticipated saving of fuel did not only not occur but the production of the blast furnace received a severe set-back. On account of these negative results and of various calculations under assumed conditions it has been proved that the substitution of lime for limestone as a flux for blast furnaces does not involve a calorific economy. The conditions and steps of the present invention exclude the principal causes which may produce disturbances in the furnace as referred to, so that smooth working is effected even when using roasted (calcinated) fluxes.

When the disturbances are eliminated it is a fact that the anticipated saving of fuel accompanied by enhanced output is obtainable. Above all, for the purpose in view, namely the proper working of a blast furnace fed with roasted (calcined) fluxes it is necessary that the necessary amount of the base which is contained in the flux, is equally joined. When adding fluxes in unroasted condition (limestone and raw dolomite) this requirement is easily and simply to be fulfilled, because the chemical composition of the added flux is known and further, the composition is subject to so little change that the operation of the blast furnace is not impaired in any respect. If, therefore 10,000 kg. of a certain ore mixture require a flux of 1620 kg. of the base, i. e. chalk+magnesia ($CaO$ or $MgO$) and if for instance 100 kg. limestone contain (according to analysis) 54% $CaO$ or $MgO$, it is necessary to add to the ore $1620 : 0.54 = 3000$ kg. limestone. When using raw stone for the blast furnace, the practical execution of said requirement is very simple. 3000 kg. limestone are added to 10,000 kg. ore mixture; that is the usual method.

If a basic flux in roasted form is used, the conditions are entirely changed. Also in the best blast furnace which is steadily operated the output will not be uniform in its composition in that in one instance more carbonic acid is burned out and in the other less is consumed. If here the same method would be used as above described, viz. to put the pre-roasted flux into the blast furnace as is done with raw stones, i. e. according to weight—the base added to the ore mixture would be subject to so large a variation, that difficulties in the operation as referred to in the beginning, would be unavoidable. An example might clear up the situation. If for instance limestone contains 54% bases and 42% carbonic acid, then the following is contained in:

Case 1.—100 kg. of this limestone completely burnt out, i. e. 100% of the $CO_2$ contained is expelled, 93.1 kg. bases ($CaO$ or $MgO$).

Case 2.—100 kg. of this limestone burnt out to a degree of ¾, i. e. 75% of the $CO_2$ contained is expelled, 78.83 kg. bases ($CaO$ or $MgO$).

Case 3.—100 kg. of this limestone only half burnt out, i. e. 50% of the $CO_2$ contained is expelled, 63.35 kg. bases ($CaO$ or $MgO$).

Let us take the example of a chalk furnace which is operated so as to expel on the average during normal operation, 75% of the $CO_2$ contained in the limestone as in Case 2. Such a condition may be required, if it is intended to obtain enough large and solid pieces from a certain limestone quality after burning, in order to have no difficulties in the furnace operation. The furnace produces periodically, differences and changes in the output as shown in Examples 1 to 3. If, however, the flux would be added to the ore according to weight the amount of the bases added to the ore would be as follows:

Instead of 3000 kg. raw stone containing 1620 kg. CaO or MgO now (for a ¾ average, i. e. 75% burnt limestone) only 2055 kg. raw stone is to be added to the ore mixture, which, however, has the same content of bases, viz. 1620 kg.

In Case 1, these 2055 kg. of burnt flux contain bases weighing 1913 kg.

In Case 3, these 2055 kg. of burnt flux contain bases weighing 1405 kg.

Therefrom result, for the normal Case 2, the following differences: Approximately + 18% in Case 1, and approximately + 13% in Case 3.

For good operation of the blast furnace and under observation of a certain pig iron quality only changes up to 3–4% as a maximum are permissible. Thus slags are obtained containing too much acid, a condition which highly impairs the pig iron quality or renders it even valueless, and in some instances, the slags are so basic and so refractory that it results in the hanging of the charge, escape of heat to the upper portion, or freezing of slags etc.

In order to put into the blast furnace with the roasted flux practically the same amounts of basic materials (as CaO or MgO) in spite of the variations of burning, the flux according to the present invention is not charged according to weight only, as heretofore done, but also according to volume and predetermined sizes.

For clearer understanding, the following may be noted: If for instance one cubic meter limestone of a certain size 7–130 mm. e. g. has an average weight of 1400 kg., this weight if the mass of the limestone contains 54% bases is equivalent to 756 kg. CaO or MgO. While burning, the volume of the limestone is not reduced, but it merely becomes lighter and more porous. If a container having a 1 m.³ volume is filled with burnt limestone of the same size, namely 7–130 mm., practically the same amount of bases (CaO or MgO) is taken up by the limestone, as in the case of raw stone, irrespective of the chalk being burned out to any degree.

The weight of the previously burnt limestone in a container of 1 m.³ volume will change, because of the variations in the burning, but the amount of bases in this container would not vary, i. e. it will remain constant or at least not exceed the permissible limits.

In the operation of a blast furnace, the control can easily be carried on in the following way: If it has been found that a container of certain volume holds a certain average weight of raw stones of a certain size, it is also known just what amount of bases corresponds to this volume. Therefore, when adding the burnt flux, only a corresponding number (for instance 2 or 2½ or 2¼ or in our example 2 container @ 1 m.³ volume) of such containers is added to a certain corresponding ore quantity to obtain the correct amount of bases in the blast furnace. In practice, it is advisable to use as a measure the charge bucket itself. It is furthermore possible to add always, the same quantity of bases to a constant charge i. e. 2 measurefulls for instance of burnt flux may be added to a furnace charge and small or larger changes may be effected during the charging of ore and coke.

It is also very easy and simple to obtain a certain size of the limestone by crushing the material to a certain maximum size (for instance in the present case to the size of 130 mm.) and to screen out the small pieces below 7 mm. The use of the finely ground parts would damage the blast furnace and they may be used to greater advantage in other industries.

If therefore, the described method is used, i. e. the basic flux of certain size is put into the furnace in burnt condition, not according to weight, but according to volume, undisturbed operation of the blast furnace is obtained, because all unadmissible changes in the amount of the bases are avoided.

In order to charge the roasted fluxes of suitable strength and size into the blast furnace it is necessary that the burnt product should be in freshly burned condition, if possible still warm to the hand, since neither burnt lime nor burnt dolomite is capable of transport or storage. It follows that the calcining kiln should be situated as closely as possible to the blast furnace in order to facilitate immediate charging into the furnace. Otherwise the calcined material immediately reacts with the moisture of the air and crumbles so that it loses the necessary strength and size which are necessary for a smooth operation of the blast furnace. Consequently the burnt product should be protected against weather during the short transport from the kiln to the blast furnace.

What I claim is:

1. The herein described method of preparing a charge for a blast furnace with roasted fluxes, namely, limestone or dolomite, which consists in crushing the fluxes into predetermined sizes and introducing the same into the furnace in predetermined volume irrespective of weight to insure a fixed amount of basic substances of the class containing (CaO or MgO) in the blast, 2. The herein described method of preparing a charge for a blast furnace with roasted fluxes, as claimed in claim 1, which consists further in introducing the fluxes into the furnace in its freshly roasted condition.

In testimony whereof I affix my signature.

ERNST BAÜMGARTNER.

CERTIFICATE OF CORRECTION.

Patent No. 1,819,064.  Granted August 18, 1931, to

It is hereby certified that the name of the patentee in the above numbered patent should be read without the umlaut mark erroneously placed over the "U"; and that the said Letters Patent should be read with this correction therein that the same may conform to the record of the case in the Patent Office.

Signed and sealed this 3rd day of November, A. D. 1931.

(Seal)

M. J. Moore,
Acting Commissioner of Patents.